(12) United States Patent
Weast et al.

(10) Patent No.: US 9,355,356 B2
(45) Date of Patent: May 31, 2016

(54) APPARATUS AND METHODS FOR CAPTURING AND GENERATING USER EXPERIENCES

(71) Applicant: INTEL CORPORATION, Santa Clara, CA (US)

(72) Inventors: John C. Weast, Portland, OR (US); Joshua J. Ratcliff, San Jose, CA (US); Rita H. Wouhaybi, Portland, OR (US); Adam Jordan, Berkley, CA (US); Charles C. Smith, Hillsboro, OR (US); Glen J. Anderson, Beaverton, OR (US); John B. Vicente, Roseville, CA (US); Lama Nachman, San Francisco, CA (US)

(73) Assignee: Intel Corporation, Santa Clara, CA (US)

( * ) Notice: Subject to any disclaimer, the term of this patent is extended or adjusted under 35 U.S.C. 154(b) by 54 days.

(21) Appl. No.: 14/128,564

(22) PCT Filed: Oct. 25, 2013

(86) PCT No.: PCT/US2013/066897
§ 371 (c)(1),
(2) Date: Dec. 20, 2013

(87) PCT Pub. No.: WO2015/060872
PCT Pub. Date: Apr. 30, 2015

(65) Prior Publication Data
US 2015/0120617 A1    Apr. 30, 2015

(51) Int. Cl.
*G06N 5/02* (2006.01)
*H04W 4/00* (2009.01)

(52) U.S. Cl.
CPC ............... *G06N 5/027* (2013.01); *H04W 4/008* (2013.01); *G06N 5/02* (2013.01)

(58) Field of Classification Search
None
See application file for complete search history.

(56) References Cited

U.S. PATENT DOCUMENTS

| 9,101,279 | B2 * | 8/2015 | Ritchey et al. | |
|---|---|---|---|---|
| 2007/0167689 | A1 | 7/2007 | Ramadas et al. | |
| 2011/0179313 | A1 | 7/2011 | MacDonald et al. | |
| 2012/0154144 | A1 | 6/2012 | Betts et al. | |
| 2013/0063550 | A1 * | 3/2013 | Ritchey ................. | G03B 37/00 348/36 |

OTHER PUBLICATIONS

International Search Report and Written Opinion mailed Jul. 28, 2014 for International Application No. PCT/US2013/066897, 11 pages.

* cited by examiner

*Primary Examiner* — Wilbert L Starks
(74) *Attorney, Agent, or Firm* — Schwabe, Williamson & Wyatt, P.C.

(57) ABSTRACT

Embodiments of apparatus and methods for capturing and generating user experiences are described. In embodiments, an apparatus may include a processor. The apparatus may also include a data storage module, coupled with the processor, to store sensor data collected by a plurality of sensors attached to one or more devices. The apparatus may further include an experience correlation module, coupled with the data storage module, to associate at least a portion of the sensor data with a user experience based at least in part on one or more rules identifying the user experience, to enable regenerating at least a part of the user experience for a user based at least in part on the portion of the sensor data. Other embodiments may be described and/or claimed.

25 Claims, 5 Drawing Sheets

Article of manufacture
510

Storage medium
520

Instructions configured to cause an apparatus, in response to execution of the instructions, to practice (aspects of) embodiments of any one of FIGS. 1-4
530

FIG. 5

APPARATUS AND METHODS FOR CAPTURING AND GENERATING USER EXPERIENCES

CROSS REFERENCE TO RELATED APPLICATIONS

The present application is a national phase entry under 35 U.S.C §371 of International Application No. PCT/US2013/066897, filed Oct. 25, 2013, entitled "APPARATUS AND METHODS FOR CAPTURING AND GENERATING USER EXPERIENCES", which designated, among the various States, the United States of America. The Specification of the PCT/US2013/066897 Application is hereby incorporated by reference.

FIELD OF THE INVENTION

The present disclosure relates generally to the technical field of computing, and more particularly, to apparatuses and methods for capturing and generating user experiences.

BACKGROUND

The background description provided herein is for the purpose of generally presenting the context of the disclosure. Unless otherwise indicated herein, the materials described in this section are not prior art to the claims in this application and are not admitted to be prior art or suggestions of the prior art, by inclusion in this section.

Clothing is an indispensable component of humanity and culture. Prehistoric humans are known to wear protective clothing to keep warm, e.g., made from animal skins. In modern society, variety of natural or artificial fiber and textile material may be used for clothing. The purpose of wearing of clothing may have evolved from protection of human body to cultural or personal expression.

A sensor is an instrument to measure a physical property, e.g., an acoustic, chemical, electrical, environmental, or optical property of an object, and convert the measurement to a signal, e.g., an electrical or optical signal, which may be read by an observer or another instrument. A sensor may be manufactured on a microscopic scale as microsensors, such as by using microelectromechanical systems (MEMS) technology, or on nano-scale as nanosensors, such as by using nanoelectromechanical systems (NEMS) technology and/or nanotechnology.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Embodiments of apparatus and methods for capturing and generating user experiences are described herein. In embodiments, an apparatus for capturing and generating user experiences may include a processor, a data storage module, coupled with the processor, to store sensor data collected by the plurality of sensors attached to one or more devices; and an experience correlation module, coupled with the data storage module, to associate at least a portion of the sensor data with a user experience based at least in part on one or more rules identifying the user experience, to enable regenerating at least a part of the user experience for a user based at least in part on the portion of the sensor data. As an example, when a married couple looking at their wedding photos at their wedding anniversary, relevant audio data captured during their wedding may be retrieved and played back to them at a proper time in order to enhance their photo-viewing experience. These and other aspects of the present disclosure will be more fully described below.

In the following detailed description, reference is made to the accompanying drawings, which form a part hereof, wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C). Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

Reference in the description to one embodiment or an embodiment means that a particular feature, structure or characteristic described in connection with the embodiment is included in at least one embodiment of the invention. The description may use the phrases "in one embodiment," "in an embodiment," "in another embodiment," "in embodiments," "in various embodiments," or the like, which may each refer to one or more of the same or different embodiments. Furthermore, the terms "comprising," "including," "having," and the like, as used with respect to embodiments of the present disclosure, are synonymous.

In embodiments, the term "module" may refer to, be part of, or include an application specific integrated circuit (ASIC), an electronic circuit, a processor (shared, dedicated, or group) and/or memory (shared, dedicated, or group) that execute one or more software or firmware programs, a combinational logic circuit, and/or other suitable components that provide the described functionality. In embodiments, a module may be implemented in firmware, hardware, software, or any combination of firmware, hardware, and software. In embodiments, the term "interface" may refer to a point of interaction with software or computer hardware, including peripheral devices such as a computer monitor, a networking device, a camera, a sensor, etc.

In embodiments, for the purposes of the present disclosure, the phrase "user experience" means the content of observation or participation in an event by a user. For the purposes of the present disclosure, the phrase "context" means any information that can be used to characterize the background of a user experience.

Figure 1:
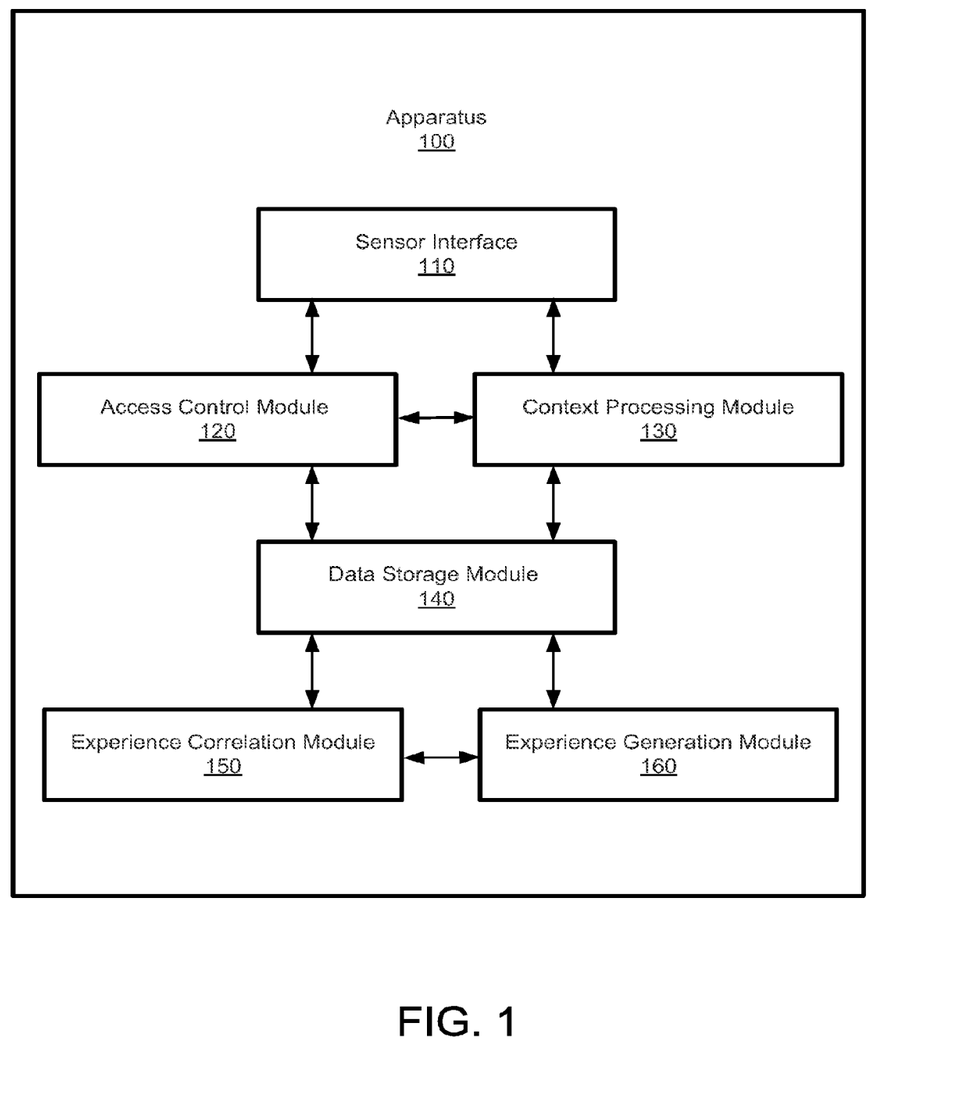
FIG. 1 is a schematic diagram illustrating an example implementation of an apparatus for capturing and generating user experiences, incorporating aspects of the present disclosure, in accordance with various embodiments.

Referring now to FIG. 1, an example implementation of an apparatus for capturing and generating user experiences, in accordance with various embodiments, is illustrated. In embodiments, apparatus 100 may be a mobile device or coupled with one or more mobile devices equipped with various sensors. In embodiments, apparatus 100 may be a distributed system with various components or subsystems distributed at various wearable, mobile, or stationary devices equipped with various sensors. In embodiments, apparatus 100 may be a wearable device or coupled with one or more wearable devices equipped with various sensors that may capture a wide range of information, e.g., environmental information, contextual information, physiological information, etc., about a particular moment in time around a user or of the user. Furthermore, apparatus 100 may utilize the sensor data and other information in generating or regenerating experiences for the user.

In embodiments, apparatus 100 may include sensor interface 110 configured to communicate with various sensors or devices with sensors to receive or send sensor data. Apparatus 100 may include access control module 120 configured to manage access to external entities and internal components from and to apparatus 100. Apparatus 100 may include context processing module 130 configured to manage contextual information and/or metadata of the sensor data. Apparatus 100 may include data storage module 140 configured to manage data storage. Moreover, apparatus 100 may include experience correlation module 150 configured to manage the relationship between the sensor data and user experiences. Furthermore, apparatus 100 may include experience generation module 160 configured to manage the generation or regeneration of an experience for a user.

In embodiments, sensor interface 110 may be configured to enable it be used to communicate with various sensors or devices with sensors to receive or send sensor data. Sensor interface 110 is intended to represent a broad range of wired or wireless interfaces including but are not limited, $I^2C$ bus, universal serial bus (USB), Bluetooth®, and the like. Sensor interface 110 may also be used to communicate with an array of sensors, distributed in multiple devices, such as multiple wearable devices or stationary devices, including, but not limited to, timepieces for recording time, positioning device for recording geographical positions, motion devices for recording velocity and acceleration information, cameras for recording images, audio and/or video recorders for recording sound and/or video, electric pulse recorders for measuring the heart rate, electroencephalography (EEG) devices for recording of electrical activity along the scalp, functional near-infrared spectroscopy (fNIR or (NIRS) devices for the purpose of functional neuroimaging, electronic noses for detecting odors or flavors, etc. Recognizing that the foregoing examples of devices with sensors were merely indicative of potential underlying sensors or technologies to interact with sensor interface 100, in other embodiments, different sensors or technologies may also be used. In embodiments, sensor interface 110 may be configured to utilize the sensor data received from various sensors to selectively actuate other types of sensors and command various sensor related operations, such as to start, stop or pause operations for some sensors, or to adjust sensitivity of other sensors.

In embodiments, sensor interface 110 may be configured to interact with sensor-rich clothing, ranging from head to toe, such as eyewear, earwear, nosewear, headwear, bodywear, handwear, legwear, footwear, etc. The article of clothing illustrated above may be equipped with one or more sensors. In some embodiments, sensors may be configured with a general purpose application processor and some storage; in other embodiments, sensors may be configured with little to no storage or computational capability, such as those sensors that only spews data for others to collect. In embodiments, various sensors may provide apparatus 100 a wide range of information, e.g., environmental information, contextual information, physiological information of a user or about the user via sensor interface 110. As an example, an article of sensor-rich clothing may capture not only the location of the user, traveling path of the user, motion characteristics of the user, but the heart rate of the user, the temperature at different body parts, even the ambient temperature, wind speed, humidity, UV index, odor, chemical composition of the air of the environment of the user. Thus, sensor-rich clothing may help a user to capture many aspects of what the user is experiencing in life.

In embodiments, access control module 120 may be configured and used to manage access to external entities and internal components from and to apparatus 100. In embodiments, the level of access may be managed at the device level. As an example, only authorized external entities, e.g., a video camera, may access apparatus 100, such as to provide video footage captured by the video camera, or retrieve video data to be displayed on the video camera. In embodiments, the level of access may also be managed at the data level. As an example, a user of apparatus 100 may need to share sensor data with another user or other devices in the environment at ad-hoc basis. For instance, apparatus 100 may receive requests for video data from nearby strangers to enrich their user experiences, or from cameras in a public park for security purpose (e.g., get different angles from the user camera). By doing so, the data transferred from apparatus 100 could be filtered first to remove any personal information (e.g., conversations recorded using microphone arrays) based on the access level of those unaffiliated devices.

In embodiments, the level of access may be managed at the user level. As an example, access control module 120 may be configured to enable or disable two wearable devices of one user to share data with each other. As another example, access control module 120 may be configured to enable or disable the transfer of sensor data from one wearable device to another based on the agreement of their respective owners. Yet as another example, access control module 120 may be configured to enable sensor-rich clothing to be shared without privacy breach by properly control the access to the sensor data captured by the sensor-rich clothing, such that individual wearers can be authenticated, and their collected data can be kept separate and private to the wearer.

In embodiments, a unique identification (ID) for the wearer of sensor-rich clothing may be created to identify the wearer. Such kind of unique identifier may be used to protect personal data collected by sensor-rich clothing. In this way, friends and siblings can be free to share clothing not to mention ensuring that the robust clothing donation and resale industry (e.g., Goodwill®, eBay®, etc.) will continue to function in a world full of sensor-rich clothing.

In embodiments, unique physical or physiological characteristics of a user may be used to uniquely identify the wearer of an article of sensor-rich clothing. No two humans are identical. Unique physical or physiological characteristics of the user may include, but is not limited to, shoulder width, arm length, muscle tone, vein signature, style of movement (i.e., gait), method of putting on the clothing, waist shape, foot pressure map, foot arch, weight, body odor, etc., or any combination thereof. These characteristics may be measured to create the unique ID and used by access control module 120 to authenticate users and determine the appropriate access level of the user.

In embodiments, data collected from a user (e.g., heart rate, etc. of the user) may be tagged with the wearer's unique ID to identify and differentiate sensor data. In embodiments, data collected for a user may also be encrypted with the wearer's unique ID with any suitable cryptographic algorithms to protect the data. As an example, the wearer's unique ID may be used in a seeded hash of the sensor data or used to sign the sensor data as a key. In embodiments, if an article of sensor-rich clothing is shared by different users, upon this recognition, apparatus 100 may respond differently depending on the usage scenario. As an example, apparatus 100 may request or command the article of sensor-rich clothing to flush all stored data of previous users, to store previous sensor data for a variable time before flushing, refuse to collect new data, etc. depending on the usage scenario. In embodiments, the response or action taken by apparatus 100 may be configured by its user.

In embodiments, context processing module 130 may be configured and used by apparatus 100 to manage contextual information and/or metadata of the sensor data. Context processing module 130 may be configured and used for the acquisition of both objective (e.g., using sensors to perceive a situation, such as the location or time of the situation) and subjective (e.g., measured user response to the situation, such as a change of pulse, respiratory rate, ERG, etc.) context information in characterizing a user experience. Context processing module 130 may be configured and used for the abstraction, recognition, or understanding of situations/activities/events relating to a user experience. As an example, context processing module 130 may include or be connected to an object and person recognition subsystem to facilitate the understanding of situations. As another example, context processing module 130 may include perceptual computing algorithms for determining user states (e.g., relaxed, excited, etc.) to facilitate the abstraction of situations associated with an experience of a user.

In embodiments, context processing module 130 may be configured to determine the context of a situation through relevant information of the user. As an example, context processing module 130 may determine that a user is in a meeting based at least in part on the calendar information of the user. As another user, context processing module 130 may determine the chronicle low fever of a user at night is normal based on the user's medical information and/or historical data of the user's body temperature. In embodiments, context processing module 130 may determine the context of a situation by searching or mining the Internet. As an example, sensor data may indicate a user has remained in the middle of a highway for long time. Context processing module 130 may presumably conclude it as a symptom of traffic jam. Furthermore, context processing module 130 may search the Internet and determine the likely cause of the presumed traffic jam is a homecoming football game. Such external information may then be acquired as a part of the context information in characterizing an experience of a user.

In embodiments, context processing module 130 may be configured to tag or mark sensor data with context information, e.g., as the metadata. As an example, sensor data may be tagged with the location and timestamp information. As another example, sensor data may be segmented and tagged with abstract segment titles in summarizing or describing their respective content. For instance, a segment of data may be tagged as "a dating experience at the Central park in New York City" or "a vocation experience at Honolulu, Hi."

In embodiments, context processing module 130 may be configured to trigger apparatus 100 to adjust its behavior based on the recognized context. As an example, apparatus 100 may respond, based on the context, to adapt user interfaces, to make the user interaction implicit, to tailor the sensor data received, or to trigger other actions based on context.

In embodiments, data storage module 140 may be configured to be used by apparatus 100 to manage data storage, e.g., to store, retrieve, query, and manipulate sensor data. Data storage module 140 may be coupled with one or more database management systems (DBMS) which allow the definition, creation, querying, update, and administration of databases. Data storage module 140 may use any one of the database standards, such as structured query language (SQL), open database connectivity (ODBC), Java database connectivity (JDBC), or any other database standard to work with more than one database. Data storage module 140 may be configured to store sensor data locally in apparatus 100 or remotely in a remote device.

In embodiments, experience correlation module 150 may be configured and used by apparatus 100 to manage the relationship between the sensor data and user experiences. In embodiments, experience correlation module 150 may associate some portions of the sensor data with an experience of a user based at least in part on one or more rules identifying the experience. As an example, experience correlation module 150 may recognize sensor data that may be bounded by rules based on time, location, physiological states of users, presence of other users or specific users, and other factors.

In embodiments, experience correlation module 150 may be configured and perform such association or correlation function when new sensor data is received by apparatus 100. In embodiments, experience correlation module 150 may perform such association or correlation function when sensor data is tagged with relevant contextual information, e.g., by context processing module 130. In embodiments, experience correlation module 150 may be configured to perform such association or correlation function upon requests from experience generation module 160. In embodiments, the determined relationship between a segment of sensor data and a user experience may be stored for future reference, e.g., by data storage module 140.

In embodiments, the rules identifying a user experience may be predefined or predetermined, and may be based at least on one factor of a location, an environmental parameter, a time, a user, a user command, an object, or an activity. Some example heuristic rules for defining a user experience may include the user remaining in a specific location of interest, the user remaining in a same location for a period of time, the time of arrival and departure from a location, the presence of a specific person detected, the presence of a specific landmark or object, an specific activity detected, and so forth.

In some embodiments, users may issue a command via a user interface of apparatus 100, to specifically define a user experience, such as marking the start and the end of a user experience. In some embodiments, users may review the sensor data, e.g., review the video recording, and specifically mark or relate some segments of sensor data as a particular user experience.

In embodiments, the rules identifying a user experience may be dynamically created, such as based at least in part on the contextual information. As an example, a new user activity may be recognized, e.g., by context processing module 130, based on some contextual cues. For instance, a novel scene with multiple people moving swiftly and chanting the word "Kabaddi" may be detected by experience correlation module 150, while context processing module 130 may provide cues that "Kabaddi" is a popular wrestling sport played in South Asia, and the current location is in New Delhi. Accordingly, a new rule for identifying "Kabaddi" experience may be dynamically created based on this newly recognized activity.

In embodiments, the rules identifying a user experience may be based on a physiological reading of a user, e.g., by context processing module 130. As an example, experience correlation module 150 may detect that user's heart rate changes and remains within given ranges for a period of time. Accordingly, period of heart rate level may be used a rule to bounds the user experience. As another example, a relaxed state of a user may be detected by context processing module 130 based on the sensor data of pulse reading, ERG reading, or other physiological readings of the user. Accordingly, the relaxed state of the user may be used as a rule to define such user experience.

In embodiments, experience generation module 160 may be configured and used by apparatus 100 to manage the generation of experiences for a user. In some embodiments, experience generation module 160 may regenerate experiences that the user has previously encountered, such as "experience playback." In some embodiments, experience generation module 160 may generate experiences for a user based on based on "borrowed experience" that previously belong to other users. In some embodiments, experience generation module 160 may create new experiences based on a combination of sensor data from different prior user experiences. In some embodiments, the generation of user experiences may be based at least in part on the portion of the sensor data relevant to the targeted user experience.

In embodiments, experience generation module 160 may be configured to receive an indication from a user for generating a user experience. The user experience may be initially recorded for the user. The user experience may be initially recorded for another user. The user experience may be novel that at least the user has never experienced previously. In embodiments, indications from the user may include user commands, measured physiological states, contextual variables (e.g., location, time, activity, presence of individuals), etc. As an example, a user may select a specific prior user experience for playback, demand a novel user experience to be created, or generally describe the targeted state of mind that the generated user experience should be providing. As another example, when a user is browsing a photo album, contextual cues associated with the browsing may become an indication that the user may like to playback part of the user experience during the time the photos are taken. Yet as another example, experience generation module 160 may make recommendations for experience creation or recreation based on contextual cues. For instance, experience generation module 160 may recommend enabling desirable physiological conditions, e.g., relaxation state after detecting the user had a stressful day. Furthermore, EEG and fNIRs sensors, along with other sensor inputs, may enable algorithms to estimate cognitive states, so that positive and negative user reactions may be used to determine the recommendations from experience generation module 160.

In embodiments, at least a portion of the stored sensor data may be correlated with the user experience, e.g., by experience correlation module 150, based at least in part on one or more rules identifying the user experience. Rules identifying a user experience may set the boundary of the user experience. Rules identifying a user experience may be predetermined, e.g., before or during sensor data are received. Rules identifying a user experience may also be dynamically defined after the indication from the user for generating a user experience is received, e.g., based on the indication. In embodiments, rules identifying a user experience may be similarly defined as previously discussed in connection with experience correlation module 150.

In embodiments, the portion of sensor data identified as correlated to the user experience may be output to one or more devices to generate the user experience based at least in part on the portion of sensor data. In embodiments, various devices may be used to recreate the environmental and physiological condition comparable to information captured at a moment in the past, e.g., by adjusting the temperate via an air conditioning device, adjusting humidity via humidifiers, generating scents via chemical vaporizers, or even facilitating feelings via head-worn bi-directional sensors. Such devices may include bi-directional sensor-rich clothing or clothing-based apparatuses that may supply squeezing, vibration, heat, and other tactile output. Such devices may include audio and visual displays, e.g., head mounted displays. Such devices may include olfactory output subsystems for generating different kinds of odors. Such devices may include augmented reality subsystems that include addition of audio or visual effects to immediate environment.

In embodiments, the wide range of environmental and physiological information that captured by sensor-rich clothing or other devices may be used to recreate, from a sensory standpoint, a previous memory experienced by a user while wearing the same clothing and/or using various output devices as previously discussed that could provide tactile, auditory, visual, and olfactory experiences that correlate with the original experience. As such, apparatus 100 may be used in many different modalities. As an example, it may be used for enhanced photo-viewing wherein the viewers of the photo (e.g., a married couple looking at their wedding photos at their wedding anniversary) may hear, see, smell, feel, and relive the scenes captured by the photo. As another example, experiences of celebrities may be sold to their fans, so that their fans may feel and sense what it was like at a great moment in history.

In embodiments, experience generation module 160 may be configured to include a sensing feedback loop. User reactions to the newly generated user experience may be measured, e.g., by experience generation module 160, so that at least one of visual, auditory, haptic, olfactory, or gustatory output of those output devices may be adjusted to reduce a difference between the measured user reactions and original user reactions represented by the portion of sensor data. For example, the sensor data captured at the moment may be compared with the sensor data used in generating the user experience, and the outputting sensor data may be magnified or minified accordingly to mitigate the gap between these two measured user experiences.

In embodiments, the sensing feedback loop in experience generation module 160 may include many different sub-loops. For example, a video sub-loop may be used to input video frame data to a head mounted display to generate virtual or mixed reality visualization, and monitor whether the user gaze in the targeted direction. As another example, an odor sub-loop may be used to input odor sensor data to olfactory output device to generated matched odor, and monitor whether comparative physiological measures of the user is achieved, e.g., heart rate representing an excited status. As another example, an audio sub-loop may be used to input audio data to speakers or headphones to generate matching audio output, and monitor whether comparative physiological measures of the user is achieved, e.g., respiratory rate representing a relaxed status. As another example, an environment sub-loop may be used to input humidity or temperature data to a weather control device (e.g., a subsystem control the air circulation of sensor-rich clothing) to generate similar environmental features, and monitor using thermometers, humidity meters, anemometer, etc. Yet as another example, an activity sub-loop may be used to remind the user of a particular activity (e.g., running, walking, eating, etc.) which the user may engage in order to achieve the targeted user experience, and monitor whether the user is indeed engaged in the recommended activities.

In embodiments, experience generation module 160 may be configured to supplement the user experience with augmented reality (AR) data. In some embodiments, experience generation module 160 may interact with augmented reality systems (ARS) to coordinate AR content with outputting devices, e.g., clothing-based sensing and output devices. In some embodiments, experience generation module 160 may interact with context processing module 130 to retrieve contextual information as a part of the AR content. In embodiments, AR content may also be outputted in the similar fashion as sensor data to various outputting devices.

In embodiments, apparatus 100 may be implemented differently as depicted in FIG. 1. As an example, context processing module 130 may be implemented as an integrated subsystem of experience correlation module 150. As another example, experience generation module 160 may be combined with experience correlation module 150 to form a comprehensive experience handling module. In embodiments, components depicted in FIG. 1 may have direct or indirect connection not shown in FIG. 1. As an example, experience correlation module 150 may be directly connected with context processing module 130 as well as access control module 120. As another example, sensor interface 110 may be directly connected with data storage module 140.

In embodiments, some or all components of apparatus 100 may be spread across any number of different devices or networks. Some or all components of apparatus 100 may be local or remote to the person whose experiences are being captured or generated. In embodiments, some or all components of apparatus 100 may be, directly or indirectly, in communication with various sensors. In embodiments, some or all components of apparatus 100 may be in communication with each other and/or various sensors via one or more communication modules (not shown in FIG. 1) with any suitable communication protocols.

Figure 2:
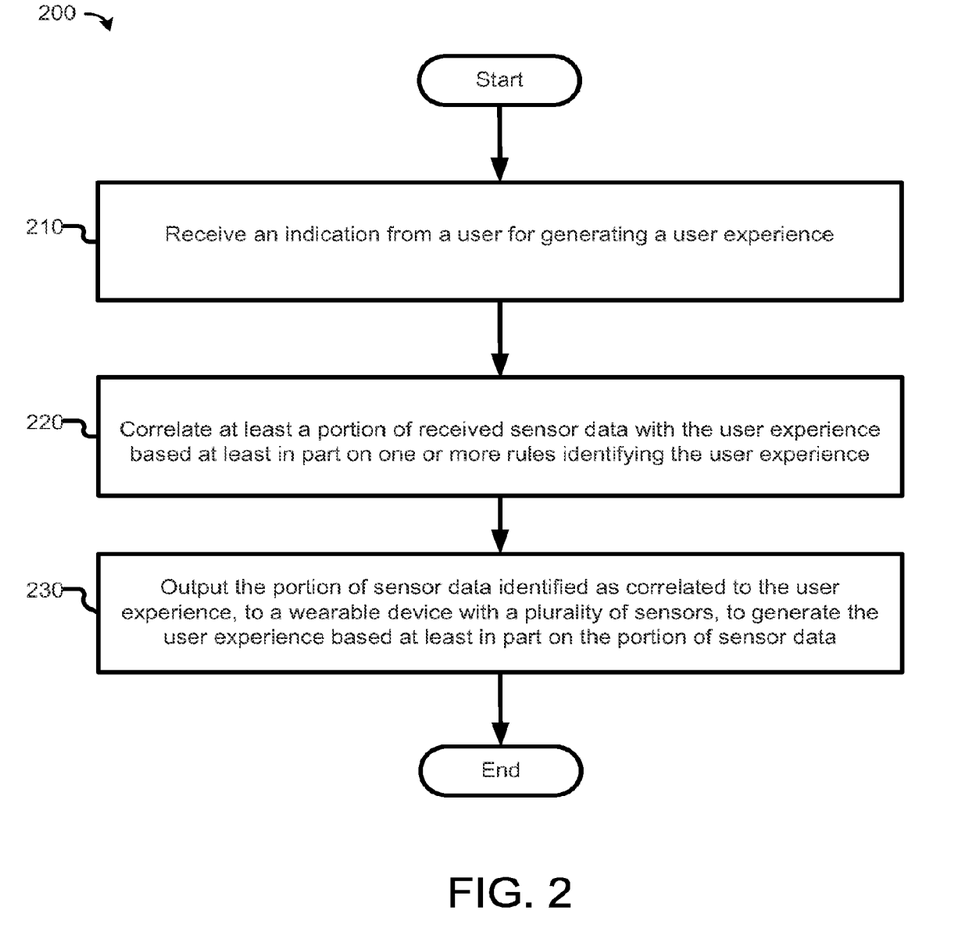
FIG. 2 is a flow diagram of an example process for capturing and generating user experiences, which may be practiced by an example apparatus, incorporating aspects of the present disclosure, in accordance with various embodiments.

Enhanced with the present disclosure, an apparatus may capture and generate user experiences, e.g., partially based on the sensor data the apparatus may receive and output via suitable devices, such as bi-directional sensor-rich clothing. Enhanced with the present disclosure, an apparatus may unify sensor data from various local or remote sensors into a unified user experience. Resultantly, a user may memorize user experiences using such apparatus, regenerate those memorized user experiences, or even create novel user experiences. Referring now to FIG. 2, it is a flow diagram of an example process for capturing and generating user experiences which may be practiced by an example apparatus incorporating aspects of the present disclosure, in accordance with various embodiments. The process 200 may be performed by processing logic that comprises hardware (e.g., circuitry, dedicated logic, programmable logic, microcode, etc.), software (e.g., instructions run on a processing device to perform hardware simulation), or a combination thereof. The processing logic may be configured to generate or regenerate a user experience for a user based at least in part on the sensor data which correlates with the user experience based on one or more rules identifying the user experience. As such, process 200 may be performed by a computing device, e.g., apparatus 100, to implement one or more embodiments of the present disclosure.

In embodiments, the process may begin at block 210, where an indication from a user for generating a user experience for the user may be received, e.g., by experience generation module 160. As discussed in connection with FIG. 1, in embodiments, indications from the user may include user commands, measured physiological states, contextual variables (e.g., location, time, activity, presence of individuals), etc. In the example below, a user may desire to recreate a state of mind that existed while at a restful scenic location. The desire to recreate this experience could be made know in a number of ways. The user could be viewing photos taken from the location and request that the experience associated with that location be recreated now. Alternatively, the system could detect some similarity (e.g., to a place in Hawaii where the user was) in the current environment, as detected via video and/or audio input, and present the "experience playback" as an recommendation to the user.

In embodiments, an indication may specifically reveal the targeted user experience, such as using exact timestamps in bound a user experience. In embodiments, an indication may generally reveal the targeted user experience, such as using a mental status (e.g., relaxed) in bound a user experience. In embodiments, the indication from the user may be further interpreted, e.g., by context processing module 130 in FIG. 1, based on the gestures, facial expressions, tone of the voice, and many other modalities of the user.

Next, at block 220, at least a portion of received sensor data may be correlated with the targeted user experience based at least in part on one or more rules identifying the user experience, e.g., by experience correlation module 150. In embodiments, the rules identifying the targeted user experience may be predefined or predetermined, and may be based at least on one factor of a location, an environmental parameter, a time, a user, a user command, an object, or an activity. In embodiments, the rules identifying the targeted user experience may be dynamically created, e.g., based at least in part on the contextual information when the indication for generating the user experience is received. In embodiments, experience correlation module 150 may formulate search queries based the rules identifying the targeted user experience. Such search queries may enable searches on the sensor data, e.g., via data storage module 140, based on the metadata of sensor data (e.g., sources of data), the contextual information tagged with the sensor data (e.g., activities involved with the data), the semantic information associated with the sensor data (e.g., the relationship among different segments of the sensor data). Therefore, experience correlation module 150 may selectively correlate relevant sensor data with the targeted user experience based on those rules identifying the targeted user experience.

Next, at block 230, the portion of sensor data identified as correlated to the user experience may be output to a wearable device with a plurality of sensors to generate the user experience for the user based at least in part on the portion of sensor data, e.g., directed by experience generation module 160 and via sensor interface 110. As previously discussed, the wearable device may provide tactile, auditory, visual, or olfactory output that correlates with the targeted user experience. In embodiments, the wearable device may be the same or a similar device captured the portion of sensor data. In embodiments, the wearable device may include bi-directional sensor-rich clothing or clothing-based apparatuses that may supply thermal, tactile, olfactory, audio, visual, or other types of output. In embodiments, the manner of outputting sensor data may be adjusted accordingly to the feedback from newly received sensor data. For example, reactions of the user to the newly generated user experience may be measured, e.g., by experience generation module 160, so that at least one of visual, auditory, haptic, olfactory, or gustatory output of those output devices may be adjusted to reduce the difference between the measured user reactions and original user reactions represented by the portion of sensor data.

Figure 3:
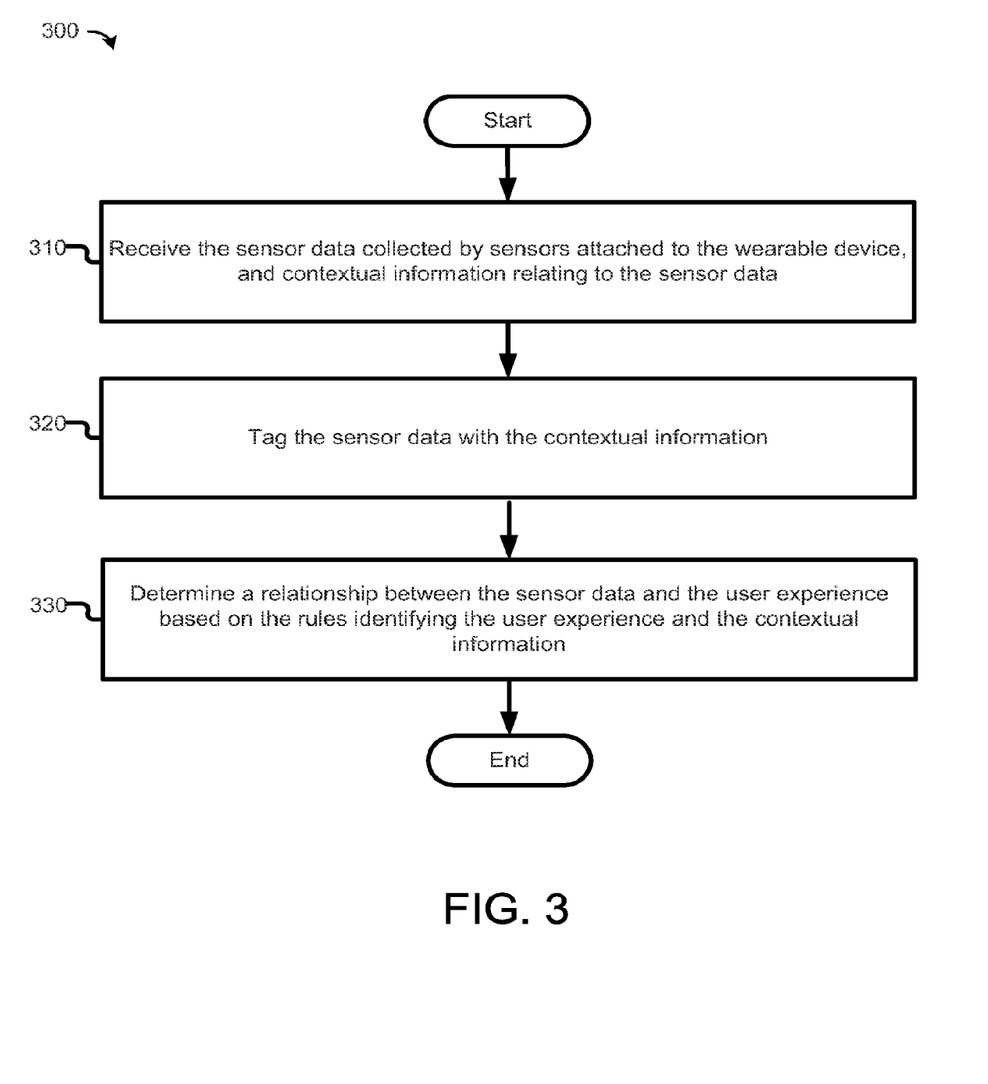
FIG. 3 is a flow diagram of an example process for correlating sensor data with user experiences, which may be practiced by an example apparatus, incorporating aspects of the present disclosure, in accordance with various embodiments.

Referring now to FIG. 3, it is a flow diagram of an example process for correlating sensor data with user experiences, which may be practiced by an example apparatus in accordance with various embodiments. As shown, process 300 may be performed by apparatus 100 to implement one or more embodiments of the present disclosure. In embodiments, process 300 may be performed in reference to block 220 in FIG. 2. In embodiments, various blocks in FIG. 3 may be combined or arranged in any suitable order, e.g., according to the particular embodiment of apparatus 100 to correlate a segment of sensor data with a user experience.

In embodiments, the process may begin at block 310, where the sensor data collected by sensors, and contextual information relating to the sensor data may be received, e.g., by data storage module 140, or retrieved, e.g., by experience correlation module 150. Such sensor data may be directly received via sensor interface 110 or received via a sensor data provider. Such contextual information may be the product of analyzing or mining the sensor data or searching on a database or the Internet.

Next, at block 320, the sensor data may be tagged with the contextual information, e.g., by context processing module 130. In embodiments, a specially designed markup language may be used for tagging the sensor data with the contextual information. In embodiments, a specially designed taxonomy with hierarchical tags or ontology with relational tags may be used in describing the sensor data or the contextual information. In embodiments, the contextual information may be saved together with the sensor data or in a separate location. In embodiments, the relationship between the sensor data and the contextual information may be saved together with the sensor data or saved in a separate database. In embodiments, the relationship between the sensor data and the contextual information may be searched, e.g., by context processing module 130 or experience generation module 160.

Next, at block 330, a relationship between the sensor data and a user experience may be determined based on the rules identifying the user experience and the contextual information, e.g., by experience correlation module 150. In embodiments, such relationship may describe the format of sensor data in relation to the user experience. As an example, a segment of sensor data may be external measurement of the environment or internal measurement of various physiological or psychological aspects of the user. As another example, a segment of sensor data may be audio, video, tactile, or olfactory forms of data relating to the user experience. Such relationship may be learned from the contextual information related to the sensor data.

In embodiments, such relationship may describe the level of relationship between the sensor data and the user experience. As an example, some sensor data may be deemed as essential to achieve a user experience, such as video data for touring a city. Some sensor data may be deemed as supplemental or optional to playback a user experience, such as the noise made by other tourists in the same trip.

Figure 4:
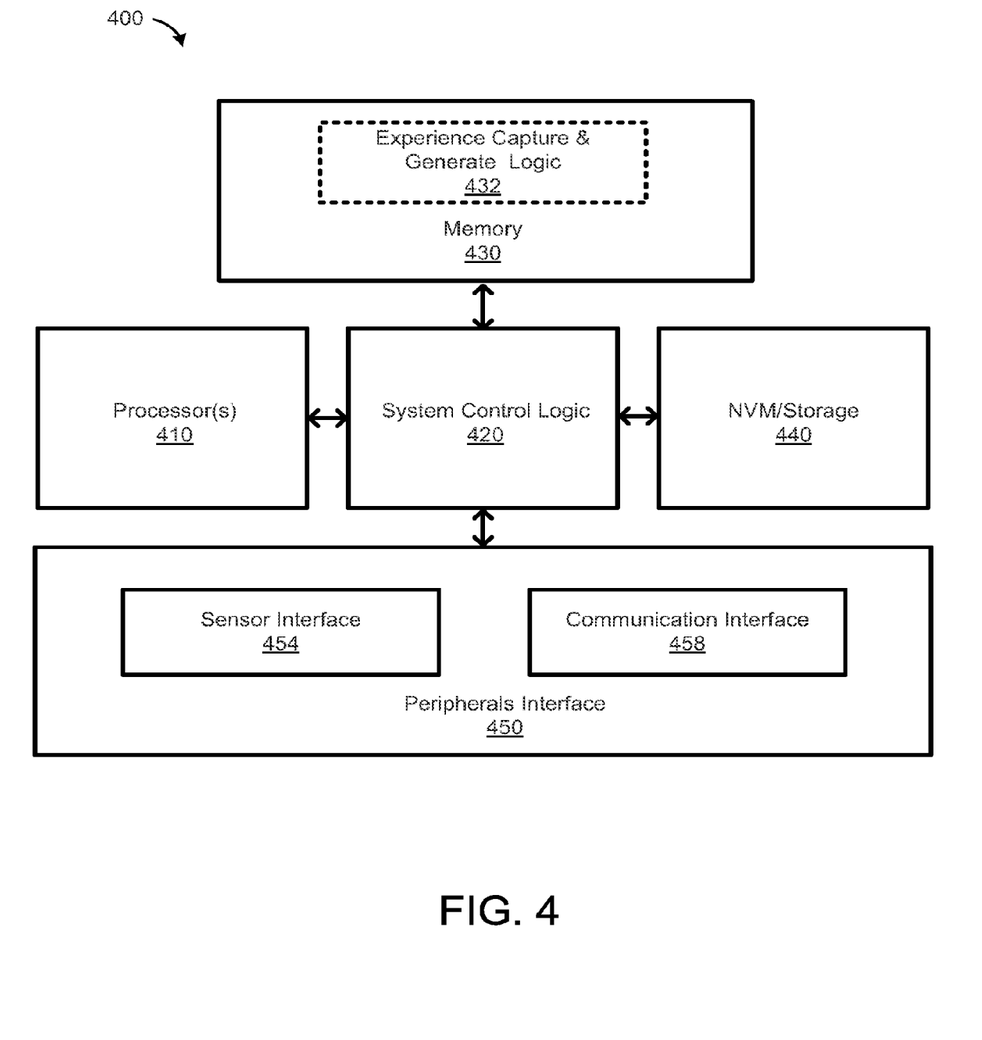
FIG. 4 illustrates an example computing device suitable for practicing the disclosed embodiments, in accordance with various embodiments.

FIG. 4 illustrates an embodiment of a computing device 400 suitable for practicing embodiments of the present disclosure. As illustrated, computing device 400 may include system control logic 420 coupled to one or more processor(s) 410, to system memory 430, to non-volatile memory (NVM)/storage 440, and to one or more peripherals interface 450. In various embodiments, the one or more processors 410 may include a processor core.

In embodiments, peripherals interface 450 may include sensor interface 454, similar to earlier described sensor interface 110 in connection with FIG. 1, which may be used as an interface for computing device 400 to communicate with the variety of sensors as previously discussed in connection with FIG. 1. Communication interface 458 within peripherals interface 450 may provide an interface for computing device 400 to communicate over one or more network(s) and/or with any other suitable device. Communication interface 458 may include any suitable hardware and/or firmware, such as a network adapter, one or more antennas, wireless interface(s), and so forth. In various embodiments, communication interface 458 may include an interface for computing device 400 to use near field communication (NFC), optical communications, or other similar technologies to communicate directly (e.g., without an intermediary) with another device. In various embodiments, communication interface 458 may interoperate with radio communications technologies such as, for example, Wideband Code Division Multiple Access (WCDMA), Global System for Mobile communications (GSM), Long Term Evolution (LTE), Bluetooth®, Zigbee, and the like.

In some embodiments, system control logic 420 may include any suitable interface controllers to provide for any suitable interface to the processor(s) 410 and/or to any suitable device or component in communication with system control logic 420. System control logic 420 may also interoperate with a display (not shown) for display of information, such as to a user. In various embodiments, the display may include one of various display formats and forms, such as, for example, liquid-crystal displays, cathode-ray tube displays, e-ink displays, projection displays. In various embodiments, the display may include a touch screen.

In some embodiments, system control logic 420 may include one or more memory controller(s) (not shown) to provide an interface to system memory 430. System memory 430 may be used to load and store data and/or instructions, for example, for computing device 400. System memory 430 may include any suitable volatile memory, such as suitable dynamic random access memory (DRAM), for example.

In some embodiments, system control logic 420 may include one or more input/output (I/O) controller(s) (not shown) to provide an interface to NVM/storage 440 and peripherals interface 450. NVM/storage 440 may be used to store data and/or instructions, for example. NVM/storage 440 may include any suitable non-volatile memory, such as flash memory, for example, and/or may include any suitable non-volatile storage device(s), such as one or more hard disk drive(s) (HDD), one or more solid-state drive(s), one or more compact disc (CD) drive(s), and/or one or more digital versatile disc (DVD) drive(s), for example. NVM/storage 440 may include a storage resource that is physically part of a device on which computing device 400 is installed or it may be accessible by, but not necessarily a part of, computing device 400. For example, NVM/storage 440 may be accessed by computing device 400 over a network via communication interface 458.

In embodiments, system memory 430, NVM/storage 440, and system control logic 420 may include, in particular, temporal and persistent copies of experience capture and generate logic 432. Experience capture and generate logic 432 may include instructions that, when executed by at least one of the processor(s) 410, result in computing device 400 to capture and generate/regenerate user experiences, such as, but not limited to, processes 200 and 300. In embodiments, experience capture and generate logic 432 may include instructions that, when executed by at least one of the processor(s) 410, result in computing device 400 to perform various functions associated with access control module 120, context processing module 130, data storage module 140, experience correlation module 150, and experience generation module 160, in connection with FIG. 1.

In some embodiments, at least one of the processor(s) 410 may be packaged together with system control logic 420 and/or experience capture and generate logic 432. In some embodiments, at least one of the processor(s) 410 may be packaged together with system control logic 420 and/or experience capture and generate logic 432 to form a System in Package (SiP). In some embodiments, at least one of the processor(s) 410 may be integrated on the same die with system control logic 420 and/or experience capture and generate logic 432. In some embodiments, at least one of the processor(s) 410 may be integrated on the same die with system control logic 420 and/or experience capture and generate logic 432 to form a System on Chip (SoC).

Depending on which modules of apparatus 100 in connection with FIG. 1 are hosted by computing device 400, the capabilities and/or performance characteristics of processors 410, system memory 430, and so forth, may vary. In various implementations, computing device 400 may be a smartphone, a tablet, a mobile computing device, a wearable computing device, etc., enhanced with the teachings of the present disclosure. In embodiments, the placement of the different modules in FIG. 4 and/or how they are clustered with other modules may be different from what is illustrated in FIG. 4. As an example, sensor interface 454 may be implemented in memory 430, together with experience capture and generate logic 432. As another example, at least part of the functions performed by experience capture and generate logic 432 may be implemented elsewhere. For instance, access control functions may be implemented as an independent module in peripherals interface 450 or directly embedded into processor(s) 410, to expedite the processing of access control and/or enhance security.

Figure 5:
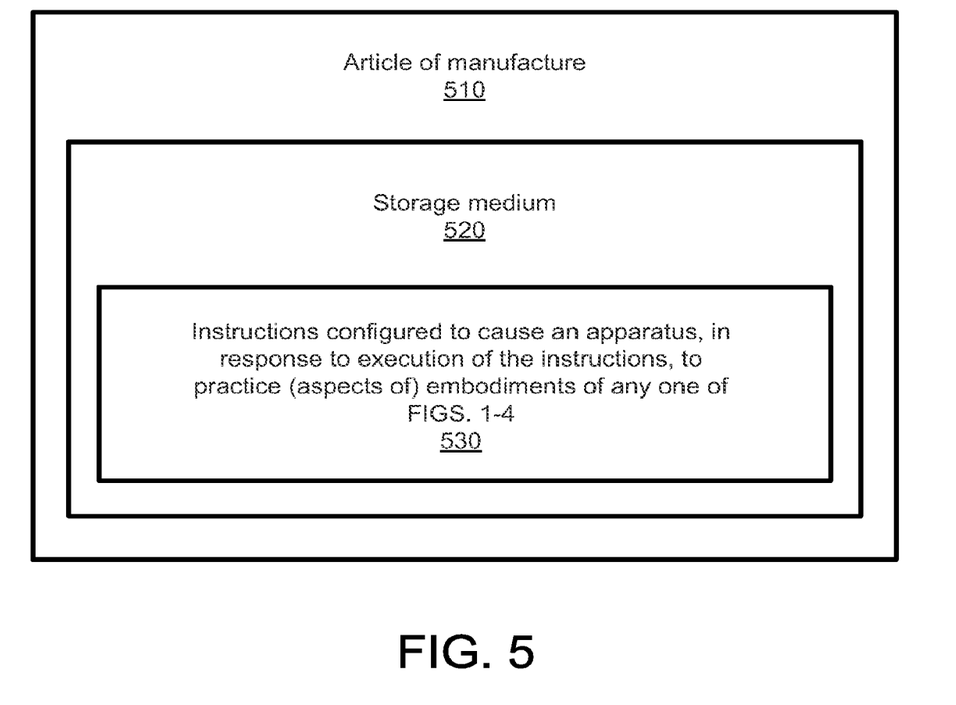
FIG. 5 illustrates an article of manufacture having programming instructions, incorporating aspects of the present disclosure, in accordance with various embodiments.

FIG. 5 illustrates an article of manufacture 510 having programming instructions, incorporating aspects of the present disclosure, in accordance with various embodiments. In various embodiments, an article of manufacture may be employed to implement various embodiments of the present disclosure. As shown, the article of manufacture 510 may include a computer-readable non-transitory storage medium 520 where instructions 530 configured to practice embodiments of or aspects of embodiments of any one of the processes described herein. The storage medium 520 may represent a broad range of persistent storage media known in the art, including but not limited to flash memory, dynamic random access memory, static random access memory, an optical disk, a magnetic disk, etc. Instructions 530 may enable an apparatus, in response to their execution by the apparatus, to perform various operations described herein. For example, storage medium 520 may include instructions 530 configured to cause an apparatus, e.g., apparatus 100, to practice some or all aspects of capturing and/or regenerating user experiences of the process 200 of FIG. 2 or process 300 of FIG. 3, in accordance with embodiments of the present disclosure. In embodiments, computer-readable storage medium 520 may include one or more computer-readable non-transitory storage medium. In other embodiments, computer-readable storage medium 520 may be transitory, such as signals, encoded with instructions 530.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. For example, as noted earlier, while for ease of understanding the disclosure hereinabove primarily described an apparatus with a metal band on the side to demonstrate various embodiments, this disclosure may also be embodied in an apparatus without a metal band on the side. Therefore, it is manifestly intended that embodiments described herein be limited only by the claims.

The following paragraphs describe examples of various embodiments.

Example 1 is an apparatus for capturing and generating user experiences, which may include a processor; a data storage module, coupled with the processor, to store sensor data collected by a plurality of sensors attached to one or more devices; and an experience correlation module, coupled with the data storage module, to associate at least a portion of the sensor data with a user experience based at least in part on one or more rules identifying the user experience, to enable regenerating at least a part of the user experience for a user based at least in part on the portion of the sensor data.

Example 2 may include the subject matter of Example 1, and may further include a context processing module, coupled with the data storage module, to tag the sensor data with contextual information.

Example 3 may include the subject matter of Example 1 or 2, and may further include an experience regeneration module, coupled with the experience correlation module, to regenerate at least the part of the user experience through generation of at least one of visual, auditory, haptic, olfactory, or gustatory outputs, using the portion of the sensor data.

Example 4 may include the subject matter of Examples 1-3, and further specifies that the plurality of sensors may include at least a selected one of visual, auditory, tactile, olfactory, or gustatory sensors. The apparatus may further include a corresponding interface to interface with the selected one of visual, auditory, tactile, olfactory, or gustatory sensors.

Example 5 may include the subject matter of Examples 1-4, and further specifies that at least one of the one or more rules may be based on a physiological reading of a user of the apparatus.

Example 6 may include the subject matter of Examples 1-5, and further specifies that at least one of the one or more rules may be based on at least one of a location, an environmental parameter, a time, a user, an object, or an activity.

Example 7 may include the subject matter of Examples 1-6, and further specifies that the experience correlation module may further dynamically create at least one of the one or more rules.

Example 8 may include the subject matter of Examples 1-7, and further specifies that the one or more devices may include a wearable device, which may include at least one of an eyewear, earwear, nosewear, headwear, bodywear, handwear, legwear, or footwear. The apparatus may further include a corresponding interface to interface with the at least one of an eyewear, earwear, nosewear, headwear, bodywear, handwear, legwear, or footwear.

Example 9 may include the subject matter of Examples 1-8, and may further include an access control module configured to control access to the sensor data based at least in part on one or more physical characteristics of the user that may be measured by at least one sensor of the plurality of sensors to identify the user.

Example 10 may include the subject matter of Examples 1-9, and further specifies that the wearable device may be sharable among a plurality of users, and the access to a portion of the sensor data collected for the user may be controlled by the user via the access control module.

Example 11 may include the subject matter of Example 10, and further specifies that the one or more physical characteristics of the user may include at least one or more of body odor, body shape, body weight, vein signature, style of movement, or foot pressure map of the user.

Example 12 is a method for capturing and generating user experiences, which may include receiving, by a computing device, an indication from a user for generating a user experience for the user; correlating, by the computing device, at least a portion of received sensor data with the user experience based at least in part on one or more rules identifying the user experience; and outputting, by the computing device, the portion of sensor data identified as correlated to the user experience, to a wearable device with a plurality of sensors, to regenerate the user experience for the user, based at least in part on the portion of sensor data.

Example 13 may include the subject matter of Example 12, and may further include receiving, by the computing device, the sensor data, wherein the sensor data are collected by at least one of the plurality of sensors attached to the wearable device.

Example 14 may include the subject matter of Example 12 or 13, and may further include creating, by the computing device, the one or more rules for defining the user experience.

Example 15 may include the subject matter of Examples 12-14, and may further include receiving, by the computing device, contextual information relating to the sensor data; and tagging, by the computing device, the sensor data with the contextual information.

Example 16 may include the subject matter of Examples 12-15, and further specifies that correlating may include determining a relationship between the portion of sensor data and the user experience based at least in part on the contextual information.

Example 17 may include the subject matter of Examples 12-16, and further specifies that outputting may include outputting the portion of sensor data for at least one of visual, auditory, haptic, olfactory, or gustatory sensors of the wearable device.

Example 18 may include the subject matter of Examples 12-17, and may further include measuring, by the computing device, reactions of the user to the generated user experience; and adjusting, by the computing device, at least one of visual, auditory, haptic, olfactory, or gustatory output of the wearable device to reduce a difference between the measured reactions of the user and original reactions of the user represented by the portion of sensor data.

Example 19 may include the subject matter of Examples 12-18, and may further include outputting, by the computing device, augmented reality data to supplement the user experience of the user with the augmented reality data.

Example 20 is a computer-readable storage medium having stored therein instructions configured to cause a device, in response to execution of the instructions by the device, to practice the subject matter of any one of Examples 12-19. The storage medium may be non-transient.

Example 21 is an apparatus for capturing and generating user experiences, which may include means for receiving an indication from a user for generating a user experience for the user; means for correlating at least a portion of received sensor data with the user experience based at least in part on one or more rules identifying the user experience; and means for outputting the portion of sensor data identified as correlated to the user experience, to a wearable device with a plurality of sensors, to regenerate the user experience for the user, based at least in part on the portion of sensor data.

Example 22 may include the subject matter of Example 21, and may further include means for creating the one or more rule for defining the user experience.

Example 23 may include the subject matter of Example 21 or 22, and may further include means for receiving contextual information relating to the sensor data; and means for tagging the sensor data with the contextual information.

Example 24 may include the subject matter of Example 23, and may further include means for determining a relationship between the portion of the sensor data and the user experience based on at least in part on the contextual information.

Example 25 may include the subject matter of Examples 21-24, and further specifies that means for outputting may include means for outputting the portion of sensor data for at least one of visual, auditory, haptic, olfactory, or gustatory sensors of the wearable device.

What is claimed is:
1. An apparatus, comprising:
   a processor;
   a data storage module, coupled with the processor, to store sensor data collected at different times by a plurality of sensors embedded with a footwear, while the footwear is worn by a plurality of wearers at the different times, wherein the sensor data collected include environmental data, contextual data and physical characteristic data of the wearers; wherein the physical characteristic data comprises at least foot arch data and foot pressure map data to identify the respective wearers; and wherein the environmental and contextual data of the wearers are correspondingly associated with the physical characteristics of the wearers; and
   an access control module to control subsequent access to the corresponding environmental and contextual data of the wearers, based at least in part on the physical characteristic data of the wearers that include foot arch data and foot pressure map data of the wearers.

2. The apparatus according to claim 1, further comprising:
a context processing module, coupled with the data storage module, to tag the sensor data of the wearers with contextual information, based at least in part on the contextual data collected by the sensors for the wearers.

3. The apparatus according to claim 1, further comprising:
an experience correlation module, coupled with the data storage module, to associate at least a portion of the sensor data of a first of the plurality of wearers with a user experience of the first wearer based at least in part on one or more rules identifying the user experience; and
an experience regeneration module, coupled with the experience correlation module, to regenerate at least the part of the user experience for the first wearer through generation of at least one of visual, auditory, haptic, olfactory, or gustatory outputs, using the portion of the sensor data of the first wearer.

4. The apparatus according to claim 3, wherein at least one of the one or more rules is based on a physiological reading of the first wearer.

5. The apparatus according to claim 3, wherein at least one of the one or more rules is based on at least one of a location, an environmental parameter, a time, the first wearer, an object, or an activity.

6. The apparatus according to claim 3, wherein the experience correlation module is to further dynamically create at least one of the one or more rules.

7. The apparatus according to claim 1, wherein the plurality of sensors comprise at least a selected one of visual, auditory, tactile, olfactory, or gustatory sensors, and wherein the apparatus further comprises a corresponding interface to interface with the selected one of visual, auditory, tactile, olfactory, or gustatory sensors.

8. The apparatus according to claim 1, and wherein the apparatus further comprises a corresponding interface to interface with the footwear.

9. A method, comprising:
storing, by a computing device, sensor data collected at different times by a plurality of sensors embedded in a footwear worn by a plurality of wearers at the different times, wherein the sensor data include environmental data, contextual data and physical characteristic data of the wearers, wherein the physical characteristic data comprises at least foot arch data and foot pressure map data to identify the respectively wearers, and wherein the environmental and contextual data of the wearers are correspondingly associated with the physical characteristics of the wearers; and
subsequent to the storing, controlling access to the corresponding sensor data of the wearers, by the computing device, based at least in part on physical characteristic data of the wearers that include foot arch data and foot pressure map data of the wearers.

10. The method of claim 9, further comprising:
receiving, by the computing device, an indication from a first of the plurality of wearers for generating a user experience for the first wearer;
correlating, by the computing device, at least a portion of the received sensor data of the first wearer with the user experience based at least in part on one or more rules identifying the user experience; and
outputting, by the computing device, the portion of sensor data of the first wearer identified as correlated to the user experience, to regenerate the user experience for the first wearer based at least in part on the portion of sensor data.

11. The method of claim 10, further comprising:
creating, by the computing device, the one or more rules for defining the user experience.

12. The method of claim 10, further comprising:
determining, by the computing device, a relationship between the portion of sensor data and the user experience based at least in part on the contextual information.

13. The method of claim 10, wherein outputting comprises outputting the portion of sensor data for at least one of visual, auditory, haptic, olfactory, or gustatory sensors of the wearable device.

14. The method of claim 9, further comprising:
receiving, by the computing device, contextual information relating to the sensor data; and
tagging the sensor data of the wearers, by the computing device, with the contextual information based at least in part on the contextual data collected by the sensors for the wearers.

15. At least one non-transitory machine readable storage medium having a plurality of instructions to cause an apparatus, in response to execution of the plurality of instructions by the apparatus, to:
store sensor data collected at different times by a plurality of sensors embedded in a footwear worn by a plurality of wearers at the different times, wherein the sensor data include environmental data, contextual data and physical characteristic data of the wearers, wherein the physical characteristic data comprises at least foot arch data and foot pressure map data to identify the respective wearers, and wherein the environmental and contextual data of the wearers are correspondingly associated with the physical characteristics of the wearers; and
control subsequent access to the sensor data of the wearers based at least in part on physical characteristic data of the wearers that include foot arch data and foot pressure map data of the wearers.

16. The at least one non-transitory machine readable storage medium of claim 15 wherein the apparatus is further caused, to:
receive an indication from a first of the plurality of wearers for generating a user experience for the first wearer;
correlate at least a portion of received sensor data of the first wearer with the user experience based at least in part on one or more rules identifying the user experience; and
output the portion of sensor data of the first wearer identified as correlated to the user experience, to regenerate the user experience for the first wearer based at least in part on the portion of sensor data.

17. The storage medium of claim 16, the instructions are to further cause the apparatus to:
create the one or more rules for defining the user experience.

18. The storage medium of claim 16, wherein correlate comprises determine a relationship between the portion of sensor data of the first wearer and the user experience based at least in part on the contextual information.

19. The storage medium of claim 16, wherein output comprises output the portion of sensor data for at least one of visual, auditory, haptic, olfactory, or gustatory sensors of the wearable device.

20. The storage medium of claim 16, the instructions are to further cause the apparatus to:
measure reactions of the first wearer to the generated user experience; and
adjust at least one of visual, auditory, haptic, olfactory, or gustatory output of the wearable device to reduce a difference between the measured reactions of the first wearer and original reactions of the first wearer represented by the portion of sensor data of the first wearer.

21. The storage medium of claim 16, the instructions are to further cause the apparatus to:
output augmented reality data to supplement the user experience of the first wearer with the augmented reality data.

22. The storage medium of claim 15, the instructions are to further cause the apparatus to:
receive the sensor data.

23. The storage medium of claim 15, the instructions are to further cause the apparatus to:
receive contextual information relating to the sensor data; and
tag the sensor data of the wearers with contextual information based at least in part on the contextual data collected by the sensors for the wearers.

24. A footwear, comprising:
a plurality of sensors embedded with the footwear to collect sensor data at different times while the footwear is worn by a plurality of wearers at the different times, wherein the sensor data collected include environmental data, contextual data and physical characteristic data of the wearers; wherein the physical characteristic data comprises at least foot arch data and foot pressure map data to identify the respective wearers; and wherein the environmental and contextual data of the wearers are correspondingly associated with the physical characteristics of the wearers; and
a communication interface coupled with the sensors to send the contextual data and physical characteristic data of the wearers to a computing device to store the contextual data and physical characteristic data of the wearers, wherein the computing device is associated with an access control module to control subsequent access to the corresponding environmental and contextual data of the wearers, based at least in part on the physical characteristic data of the wearers that include foot arch data and foot pressure map data of the wearers.

25. The footwear according to claim 24, wherein the plurality of sensors comprises at least a selected one of visual, auditory, tactile, olfactory, or gustatory sensors, and wherein the apparatus further comprises a corresponding interface to interface with the selected one of visual, auditory, tactile, olfactory, or gustatory sensors.

* * * * *